United States Patent [19]
Nagano

[11] Patent Number: 4,955,849
[45] Date of Patent: Sep. 11, 1990

[54] FRONT DERAILLEUR FOR USE IN BICYCLE

[75] Inventor: Masashi Nagano, Izumi, Japan

[73] Assignee: Shimano Industrial Co., Ltd., Osaka, Japan

[21] Appl. No.: 373,319

[22] Filed: Jun. 28, 1989

[30] Foreign Application Priority Data

Jun. 30, 1988 [JP] Japan ............................. 63-87766[U]

[51] Int. Cl.⁵ .............................................. F16H 11/08
[52] U.S. Cl. ....................................... 474/80; 474/140
[58] Field of Search .................................... 474/77–82, 474/140

[56] References Cited

U.S. PATENT DOCUMENTS 4,551,121 11/1985 Nagano ............................. 474/82 X
4,586,913 5/1986 Nagano ............................. 474/82 X
4,613,319 9/1986 Nagano ................................. 474/80

*Primary Examiner*—Thuy M. Bui
*Attorney, Agent, or Firm*—Edwin E. Greigg

[57] ABSTRACT

A front derailleur for use in a bicycle. The front derailleur provides a plurality of speeds through selective engagement of a driving chain with any one of at least three sprockets by applying a control force to a portion of a link mechanism urged by an urging member thereby moving a chain guide connected with the link mechanism against the urging force of the urging member. The link mechanism is operable to move the chain guide while varying its posture so as to provide an increased pivot amount between the sprocket pair adjacent the urging side whereas to provide a reduced pivot amount between the sprocket pair distant from the urging side, in comparison with the conventional mechanism of this type. This novel construction permits sufficient urging force at the middle sprocket position in accordance with increase in the deformation amount of the urging member, thereby to provide a reliable change speed operation by the sufficient urging force.

10 Claims, 4 Drawing Sheets

FRONT DERAILLEUR FOR USE IN BICYCLE

BACKGROUND OF THE INVENTION

1. Field of the Invention

The present invention relates to a front derailleur for use in a bicycle, and more particularly to a front derailleur of the above-noted type having a link mechanism with a plurality of links including a movable first link and a second link fixedly secured to a bicycle frame; a chain guide operatively connected to the movable first link; urging means for urging the chain guide; and a control unit operatively connected to the link mechanism for transmitting a control force to the same. With an input of control force from the control unit, the link mechanism is pivoted to move the chain guide against the urging force of the urging means thereby selectively engaging the chain with a first sprocket positioned at an urging side end of the urging means, at least one middle sprocket and a second sprocket opposed to the first sprocket across the middle sprocket.

2. Description of the Related Arts

A conventional bicycle front derailleur, as illustrated in FIG. 6, employs a parallel quadruple link mechanism of the equilateral type, with opposed link pairs respectively having same inter-pivot distances L1, L2 and L3, L4, for fixedly maintaining the posture of the chain guide (e.g. a Japanese published untility model No. 57-39271). For effecting a change speed operation with this derailleur, a control unit 29 for the link mechanism 20 is pulled via an unillustrated cable against the urging force of urging means 40 attached to the link mechanism thereby moving the chain guide 30 in a direction opposed to the urging direction of the urging means 40 (this direction will be referred to as 'reverse urging side' hereinafter). Alternately, the cable is released by a predetermined amount to move, in cooperation with the urging force of the urging means, the chain guide along the urging direction (this direction will be referred to as 'forward urging side' hereinafter).

With the above construction, as known from the Hook's law, the advancement of chain guide 30 towards the forward urging side associates a decrease in deformation amount of the urging force and consequently a decrease in the urging force thereof to be used for further moving the guide in this direction. Accordingly, when the cable is released for another speed change, this change speed operation from the middle sprocket 53 to the first sprocket 51 positioned in the forward urging side cannot be effected smoothly as compared with the change speed operation from the second sprocket 52 positioned in the reverse urging side to the middle sprocket 53.

Furthermore, if the urging means 40 has a strong urging force, as the chain guide moves towards the reverse urging side, there occurs increasing resistance in the urging force against the pulling force F of the cable to be used for moving the guide towards the forward urging side. Therefore, a greater operation force is necessary for a change speed with moving the chain guide from the middle sprocket 53 to the second sprocket 52 than that required for a change speed with moving the same from the first sprocket 51 to the middle sprocket 53. As the result, the change speed operation from the middle sprocket 53 to the second sprocket 52 cannot be effected smoothly.

With view to the above-described state of the art, the primary object of the present invention is to provide an improved bicycle front derailleur capable of reliably effecting a change speed operation regardless of the sprocket-position of the chain guide with the aid of a sufficient urging force and achieving minimized difference in operation forces required for various change speeds.

SUMMARY OF THE INVENTION

In order to accomplish the above-described object, a front derailleur for use in a bicycle related to the present invention comprises a novel link mechanism. This link mechanism operates to incline the posture of chain guide at its position corresponding to the middle sprocket so as to move the leading end of the guide towards the urging side with respect to the posture of the guide at its position corresponding to the first sprocket. Further, the mechanism alternately operates to incline the posture of the chain guide at its position corresponding to the second sprocket so as to move the leading end of the guide away from the urging side with respect to the posture of the same at its position corresponding to the middle sprocket. Functions and effects of this feature will be described next.

As illustrated in FIGS. 1 and 2, the chain guide 30 has working portions 37 and 38 (for primarily effecting a change speed operation) cooperative with its leading end 36. Then, if the amount of horizontal movement of a reference position 61 between the working portions 37 and 38 required for a complete speed change is defined as H1, the first link 39 effects a horizontal movement by an amount H2, which is greater than the amount H1, for a speed change between the first sprocket 51 and the middle sprocket 53. On the other hand, the first link effects a horizontal movement by an amount H3, which is smaller than the amount H1, for a speed change between the middle sprocket 53 and the second sprocket 52. That is to say, for the change speed between the first sprocket 51 and the middle sprocket 53, this link mechanism 20 provides a greater pivot amount $\theta 1$ (indicated by a solid line) than a pivot amount $\theta 2$ (indicated by a dashed line) provided by the conventional mechanism. Whereby, as defined by the Hook's law, the urging means 40 may have a sufficiently large urging force for reliably realizing the change speed from the middle sprocket 53 to the first sprocket 51. Reversely, for the change speed between the middle sprocket 53 and the second sprocket 52, the link mechanism 20 provides a smaller pivot amount $\theta 2$ than a pivot amount $\theta 4$ of the prior art. Accordingly, it becomes possible to minimize the difference between the maximum operation forces F1 and F2 needed respectively for the change speed from the first sprocket 51 to the middle sprocket 53 and for that from the middle sprocket 53 to the second sprocket 52, while particularly facilitating the change speed operation of the latter.

Consequently, the present invention has achieved the intended object of providing an improved bicycle front derailleur capable of reliably effecting a change speed operation regardless of the sprocket-position of the chain guide with the aid of a sufficient urging force and achieving minimized difference in operation forces required for various change speeds.

The foregoing and other objects, features and advantages of the invention will be apparent from the following more particular description of preferred embodiments of the invention, as illustrated in the accompanying drawings.

BRIEF DESCRIPTION OF THE DRAWINGS

FIGS. 1 thorugh 5 illustrates a front derailleur for use in a bicycle according to one preferred embodiment of the invention; in which, FIG. 1 is a schematic view illustrating operations of a link mechanism as viewed rearwardly of a bicycle.

DESCRIPTION OF THE PREFERRED EMBODIMENTS

Preferred embodiments of the invention will be particularly described hereinafter with reference to the accompanying drawings.

Figure 5:
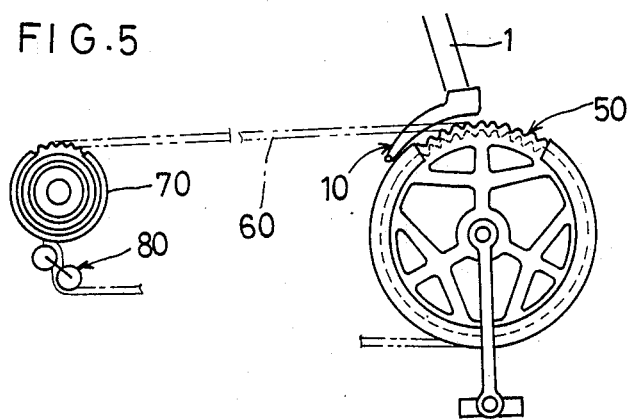
FIG. 5 is a side view showing a transmission assembly of the bicycle.
Figure 6:
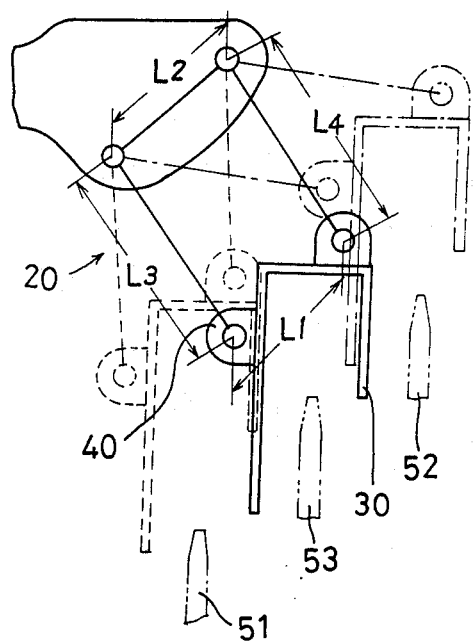
FIG. 6 is a schematic showing the prior art construction.

FIG. 5 shows a change speed mechanism used in a multi-speed bicycle. As shown, this mechanism transmits a rider's foot force from the pedal from a pedal side multistage sprocket assembly 50 via a chain 60 to a rear wheel side multistage sprocket assembly 70, with the force being transmitted in a plurality of speeds through a front derailleur 10 and a rear derailleur 80.

Figure 1:
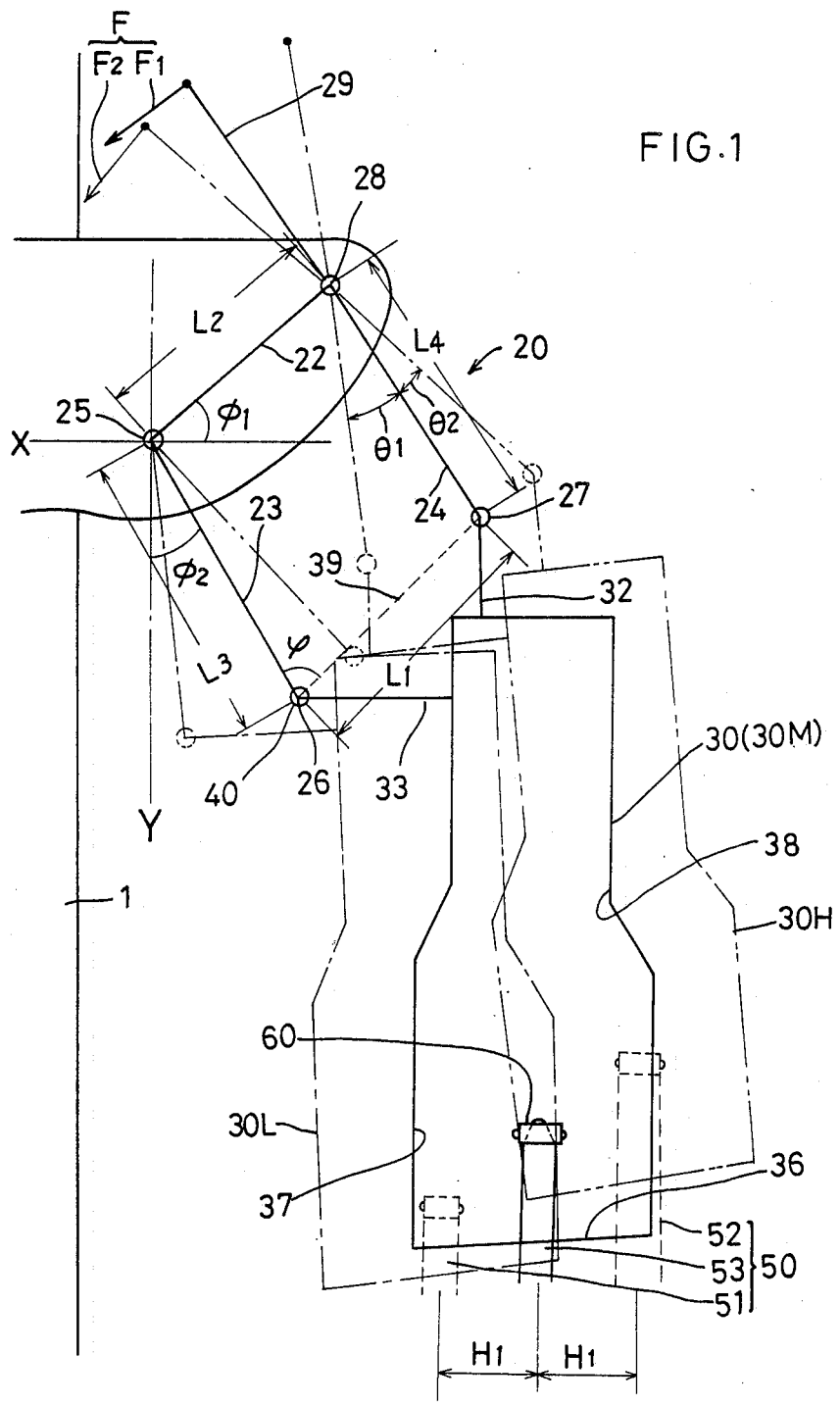

As illustrated in FIG. 1, the front derailleur 1 effects a change speed by pivoting a link mechanism 20 to move a chain guide 30. In this embodiment, the multistage sprocket assembly 50, i.e. a chain gear cluster to which the chain 60 selectively comes into engagement, includes a first sprocket 51 having a smallest diameter for a low speed and disposed adjacent a bicycle frame 1 supporting an unillustrated saddle, a middle sprocket 53 having a medium diameter for a middle speed and a second sprocket 52 having a largest diameter for a high speed, with the sprockets 51, 53 and 52 being disposed in the mentioned order from the side of the bicycle frame 1 with a distance H1 therebetween.

Figure 3:
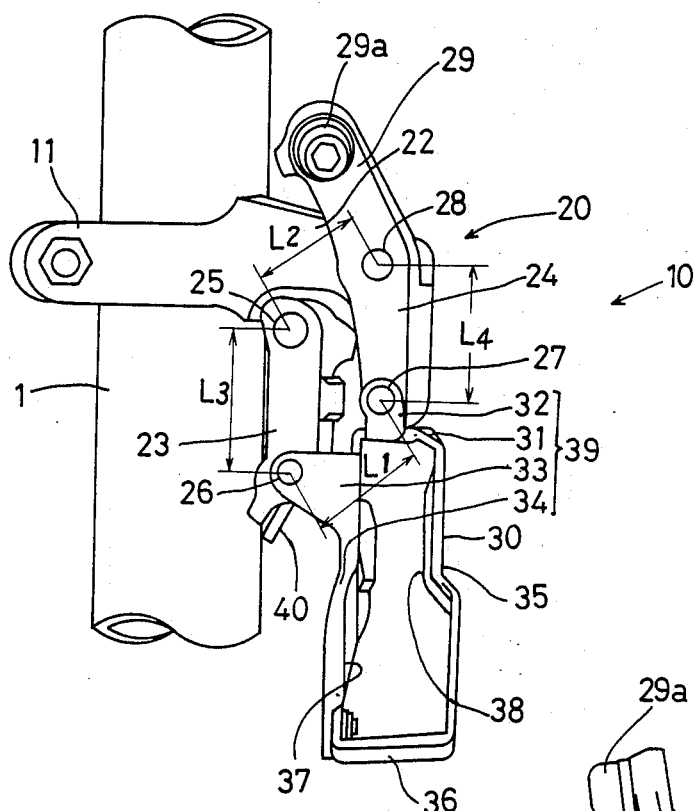
FIG. 3 is a view showing the major portions of the front derailleur.
Figure 4:
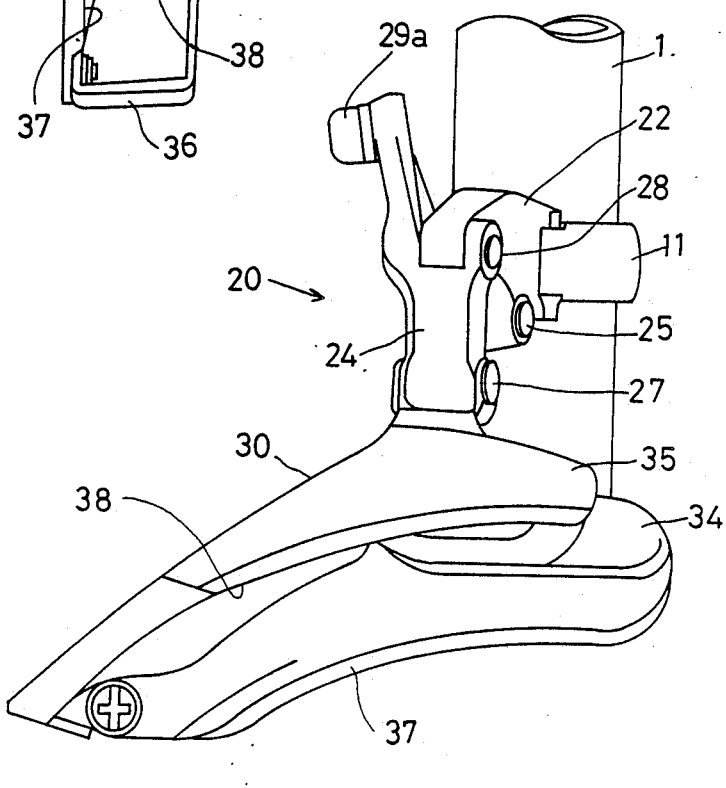
FIG. 4 is a side view of the major portions.

As shown in FIGS. 3 and 4, the chain guide 30 includes a pair of pressing plates 34 and 35 formed of a single bent plate having a lower end 36 for interconnecting the plates 34 and 35. The pressing plates 34 and 35 respectively form at inner sides thereof working faces 37 and 38 with curved lower portions thereof being projected towards the interior of the chain guide. And, these working faces 37 and 38 face in substantially parallel with each other and selectively come into contact with the chain 60. An upper portion 31 of the chain guide 30 and support 32 and 33 provided at upper positions of the frame side pressing plate 34 together which constitute a first link 39 of the link mechanism 20 which is to be more particularly described next.

The link mechanism 20 includes, in addition to the above-described first link 39, a second link 22 fixedly secured to the bicycle frame 1 via an attaching element 11 and third and fourth links 23 and 24 pivotably connected with the second link 22 via first and fourth pins 25 and 28, respectively. Further, these third and fourth links 23 and 24 have their lower ends pivotably connected with the first link 39 via second and third pins 26 and 27, respectively. With these elements and connections, the link mechanism 20 is constructed as a quadruple link mechanism.

Between the first and third links 39 and 23, there is provided a coil spring 40 fitted on the second pin 26 and acting as an urging means for urging the third link 23 to pivot clockwise about the first pin 25. With this, the chain guide 30 is normally urged towards the first sprocket 51 adjacent the bicycle frame 1.

The fourth link 24 continuously forms an arm 29 above and beyond the fourth pin 28. This arm 29, as a transmitting portion, has its leading end operatively connected via a bolt 29a with an unillustrated cable extending from a shifting lever. When this cable is pulled with an operation force F against the urging force of the spring 40, the arm 29 effects a counterclock pivot motion about the fourth pin 28 to shift the chain guide 30 towards the second sprocket 52.

Further, in the link mechanism 20, as illustrated in FIGS. 1 and 3, the third link 23 has an inter-pivot distance L3 larger than an inter-pivot distance L4 of the fourth link 24. Also, the first link 39 has an inter-pivot distance L1 which is larger than an inter-pivot distance L2 of the second link 22. With these, at a position corresponding to the middle sprocket 53 (to be referred to as 'a medium-speed sprocket position 30M' hereinafter), the working faces 37 and 38 of the pressing plates 34 and 38 of the chain guide 30 are placed substantially parallel with the side face of the middle sprocket 53. Whereas, at positions corresponding to the first and second sprockets 51 and 52 (to be respectively referred to as 'a slow-speed sprocket position 30L' and as 'a high-speed sprocket position 30H' hereinafter), the frame side working face 37 effects a slight upward inclining motion. For realizing these, some specific sample dimensions of the afore-mentioned inter-pivot distances of the links are provided below.

inter-pivot distance L1 (first link 39) = 20 mm
inter-pivot distance L2 (second link 22) = 19 mm
inter-pivot distance L3 (third link 23) = 25.4 mm
inter-pivot distance L4 (fourth link 24) = 23 mm
slope angle $\phi 1$ of the second link 22 relative to a plane X normal to a longitudinal axis Y of the bicycle frame 1 = 38″30′

The third link 23 forms an angle $\phi 2$ relative to the longitudinal axis Y, the angle $\phi 2$ being variably set for each sprocket position as illustrated below.

low-speed sprocket position 30L: $\phi 2 = 7.12°$
medium-speed sprocket position 30M: $\phi 2 = 25.18°$
high-speed sprocket position 30H: $\phi 2 = 43.38°$.

Figure 2:
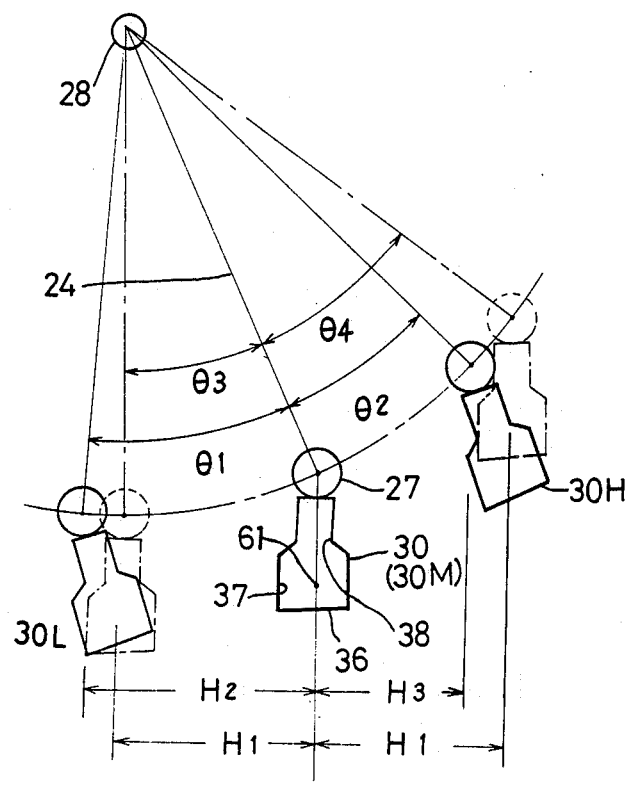
FIG. 2 is a schematic view illustrating in details the pivot amounts of the link mechanism of FIG. 1.

According to the above link mechanism 20, as illustrated in FIGS. 1 and 2, when an intermediate position 61 (reference position) between the working faces 37 and 38 of the chain guide 30 is horizontally moved by the inter-sprocket distance H1 of the multistage sprocket assembly 50, the third pin 27 effects a horizontal movement by an amount H2, which is greater than the amount H1, for a speed change between the first sprocket 51 and the middle sprocket 53. Thus, in proportion to an increase in the pivot angle $\theta 1$ of the fourth link 24, there occurs an increase in the angle $\psi$ between the third and first links 23 and 39 which angle determines the urging force of the spring 40, whereby the chain guide 30 may be smoothly moved from the medium-speed sprocket position 30M to the low-speed sprocket position 30L with the aid of the sufficient urging force.

On the other hand, for a change speed between the middle sprocket 53 and the second sprocket 52, the third pin 27 effects a horizontal movement by an amount H3 which is smaller than the amount H1. Thus, in proportion to a decrease in the pivot angle θ2 of the fourth link 24, there occurs a decrease in the angle ψ between the third and first links 23 and 39, whereby it becomes possible to reduce the difference between the minimum operation force F1 needed for moving the chain guide 30 from the low-speed sprocket position 30L to the medium-speed sprocket position 30M and the minimum operation force F2 needed for moving the guide 30 from the medium-speed sprocket position 30M to the high-speed sprocket position 30H.

Some alternate embodiments of the invention will be specifically described next.

(I) The link mechanism 20 usable in the present invention is not limited to the above-described quadruple type, but may consist of more than five link elements.

(II) For achieving the same functions as above of the link mechanism 20, it is also conceivable that the inter-pivot distance L3 of the third link 23 is greater than the inter-pivot distance L4 of the fourth link 24, or that the inter-pivot distance L1 of the first link 39 is set greater than the inter-pivot distance L2 of the second link 22 while the remaining opposed link pair have the same inter-pivot distance. Many and other improvements and modifications will be apparent for those skilled in the art in the dimensional relationship of the links.

(III) The same effects as described in the previous embodiment will be achieved also if the working faces 37 and 38 of the chain guide 30 are placed substantially parallel with the side face of the first sprocket 51 or the second sprocket 52 at the positions corresponding to these sprockets 51 and 52.

(IV) In the previous embodiment, the urging means 40 is attached to the link mechanism 20. Alternately, the urging means 40 may be disposed elsewhere such as between the bicycle frame 1 and the chain guide 30. Further, as for this urging means 40, various modifications will be possible such as utilizing an expanding-/contracting force of a coil spring. It is also conceivable to adapt the urging means 40 to provide its urging force towards the second sprocket 52 instead of being towards the first sprocket 51.

(V) The previous embodiment employs one middle sprocket 53. Instead, the number of the middle sprocket 53 may be conveniently increased.

What is claimed is:

1. A front derailleur for use in a bicycle, said front derailleur comprising:
   a link mechanism (20) including a second line (22) fixedly secured to a bicycle frame (1), third and fourth links (23) and (24) operatively connected with said second link (22) via pivots (25) and (28) respectively, and a first link (39) operatively connected with said third and fourth links (23) and (24) via pivots (26) and (27) respectively;
   a chain guide (30) operatively connected to said first link (39) for moving a chain (60);
   urging means (40) for urging said chain guide (30) towards said third link (23);
   a control unit (29) operatively connected to said link mechanism 20 for transmitting a control force for pivoting said link mechanism (20);
   said link mechanism (20) being pivoted with an input of control force to said control unit (29) to move said chain guide (30) against the urging force of said urging means (40) thereby selectively engaging said chain (60) with a first sprocket (51) positioned at an urging side end of said urging means (40), at least one middle sprocket (53) or with a second sprocket (52) opposed to said first sprocket (51) across said middle sprocket (53);
   wherein said link mechanism (20) operates to incline a posture of said chain guide (30) at its position corresponding to said middle sprocket (53) so as to move a leading end of said guide (30) towards the urging side with respect to a posture of said guide (30) at its position corresponding to said first sprocket (51), said link mechanism (20) alternatively operating to incline a posture of said chain guide (30) at its position corresponding to said second sprocket (52) so as to move the leading end of said guide (30) away from the urging side with respect to the posture of the same at its position corresponding to said middle sprocket (53); and
   said third link (23) having an inter-pivot distance L3 which is longer than an inter-pivot distance L4 of said fourth link (24).

2. A front derailleur as defined in claim 1, wherein said first link has an inter-pivot distance larger than an inter-pivot distance of said second link.

3. A front derailleur as defined in claim 2, wherein said chain guide includes a pair of pressing plates laterally facing each other across said chain for moving the same via working faces thereof into said selective engagement, at least said working faces being placed in substantially parallel alignment with a side face of said middle sprocket at said position corresponding thereto.

4. A front derailleur as defined in claim 3, wherein said first sprocket has a small diameter while said middle and second sprockets have a medium and a large diameter respectively.

5. A front derailleur as defined in claim 4, wherein said middle sprocket is one in number.

6. A front derailleur as defined in claim 5, wherein adjacent pairs of said first, second and middle sprockets have a fixed interdistance.

7. A front derailleur as defined in claim 2, wherein said chain guide includes a pair of pressing plates laterally facing each other across said chain for moving the same via working faces thereof into said selective engagement, at least said working faces being placed in substantially parallel alignment with a side face of said first or second sprocket at said position respectively corresponding thereto.

8. A front derailleur as defined in claim 7, wherein said first sprocket has a small diameter while said middle and second sprockets have a medium and a large diameter respectively.

9. A front derailleur as defined in claim 8, wherein said middle sprocket is one in number.

10. A front derailleur as defined in claim 9, wherein adjacent pairs of said first, second and middle sprockets have a fixed interdistance.

* * * * *